United States Patent
Yang et al.

(10) Patent No.: US 11,816,843 B2
(45) Date of Patent: Nov. 14, 2023

(54) CAMOUFLAGED OBJECT SEGMENTATION METHOD WITH DISTRACTION MINING

(71) Applicant: DALIAN UNIVERSITY OF TECHNOLOGY, Liaoning (CN)

(72) Inventors: Xin Yang, Liaoning (CN); Haiyang Mei, Liaoning (CN); Wen Dong, Liaoning (CN); Xiaopeng Wei, Liaoning (CN); Dengping Fan, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 367 days.

(21) Appl. No.: 17/336,748

(22) Filed: Jun. 2, 2021

(65) Prior Publication Data
US 2022/0230324 A1    Jul. 21, 2022

(30) Foreign Application Priority Data
Jan. 21, 2021  (CN) .......................... 202110078735.6

(51) Int. Cl.
*G06T 7/12*   (2017.01)
*G06T 7/136*  (2017.01)
*G06T 7/73*   (2017.01)

(52) U.S. Cl.
CPC ................ *G06T 7/12* (2017.01); *G06T 7/136* (2017.01); *G06T 7/73* (2017.01); *G06T 2207/20084* (2013.01); *G06T 2207/30181* (2013.01)

(58) Field of Classification Search
CPC .. G06T 7/12; G06T 7/136; G06T 7/73; G06T 2207/20084; G06T 2207/30181;
(Continued)

(56) References Cited

U.S. PATENT DOCUMENTS

2019/0370965 A1* 12/2019 Lay .......................... G06N 20/00

FOREIGN PATENT DOCUMENTS

CN         111462126        *   4/2020

OTHER PUBLICATIONS

Machine translation for CN 111462126 (Year: 2020).*
(Continued)

*Primary Examiner* — Qian Yang
(74) *Attorney, Agent, or Firm* — Muncy, Geissler, Olds & Lowe, P.C.

(57) ABSTRACT

A method for segmenting a camouflaged object image based on distraction mining is disclosed. PFNet successively includes a multi-layer feature extractor, a positioning module, and a focusing module. The multi-layer feature extractor uses a traditional feature extraction network to obtain different levels of contextual features; the positioning module first uses RGB feature information to initially determine the position of the camouflaged object in the image; the focusing module mines the information and removes the distraction information based on the image RGB feature information and preliminary position information, and finally determines the boundary of the camouflaged object step by step. The method of the present invention introduces the concept of distraction information into the problem of segmentation of the camouflaged object and develops a new information exploration and distraction information removal strategy to help the segmentation of the camouflaged object image.

1 Claim, 2 Drawing Sheets

(58) Field of Classification Search
CPC . G06T 2207/20081; G06T 7/194; G06T 7/11; G06T 7/0002; G06T 2207/10024; G06N 3/04; G06N 3/08
See application file for complete search history.

(56) References Cited

OTHER PUBLICATIONS

Zheng et al. "Detection of People With Camouflage Pattern Via Dense Deconvolution Network", IEEE Signal Processing Letters, vol. 26, No. 1, Jan. 2019 (Year: 2019).*
Chen et al., "Contour-Aware Loss: Boundary-Aware Learning for Salient Object Segmentation", IEEE Transactions on Image Processing, vol. 30, 2021 (Year: 2021).*
Fan et al. "Camouflaged Object Detection", Proceedings of the IEEE/CVF Conference on Computer Vision and Pattern Recognition (CVPR), 2020, pp. 2777-2787 (Year: 2020).*
Lu et al., "See More, Know More: Unsupervised Video Object Segmentation with Co-Attention Siamese Networks", 2019 IEEE/CVF Conference on Computer Vision and Pattern Recognition (CVPR) (Year: 2019).*
Singh et al., "Survey of Object Detection Methods in Camouflaged Image", 2013 International Conference on Electronic Engineering and Computer Science (Year: 2013).*

\* cited by examiner

CAMOUFLAGED OBJECT SEGMENTATION METHOD WITH DISTRACTION MINING

TECHNICAL FIELD

The invention belongs to the scene segmentation methods in the computer vision field, and the specific realization result is the segmentation of image content, particularly related to a segmentation method of camouflaged object in real environment images.

BACKGROUND

Two-dimensional image segmentation refers to distinguishing the pixels belonging to different objects in the environment image and determining their size, shape, and position. It is a key step from image processing to image analysis and has great application value. In recent years, segmentation-related tasks, such as object detection, depth estimation, salient region detection, and shadow detection, have achieved significant performance improvements.

Quite a few creatures in nature have evolved superb camouflaged skills and can disguise themselves to integrate into the surrounding environment. The appearance of such creatures in images will greatly affect the scene understanding, which affects the accuracy of various computer vision tasks and applications. The object's camouflaged ability makes the area of the object in images show the appearance of the surrounding environment, and most of the time, the camouflaged object is also a challenge to the human visual system. The diversity of the scene, the diversity of camouflaged objects in the scene, and the diversity of the camouflaged object's shape determine the difficulty of such image processing. Therefore, segmenting the camouflaged object is a fundamentally challenging task due to the fact that the camouflage strategy works by deceiving the visual perceptual system of the observer and thus a significant amount of visual perception knowledge is required to eliminate the ambiguities caused by the high intrinsic similarities between the target object and the background. Since there is no effective method to distinguish camouflaged objects from the image background, the camouflaged object's existence in the scene image will seriously affect the current computer vision system.

Methods related to camouflaged object segmentation mainly include generic object detection, salient object detection, and specific region segmentation.

Generic Object Detection (GOD) seeks to locate object instances from several predefined generic categories in natural images, which is one of the most fundamental and challenging problems in computer vision and forms the basis for solving complex or high-level vision tasks such as segmentation, scene understanding, and object tracking. The generic objects in a scene can be either conspicuous or camouflaged, and the camouflaged ones can be seen as hard cases. Therefore, directly applying GOD methods to segment camouflaged objects may not get the desired results.

Salient Object Detection (SOD) aims to identify and segment the most attention-grabbing object(s) in an input image. The traditional SOD method relies on artificially set low-level features (such as color and contrast); the SOD method based on deep learning uses bottom-up and top-down saliency inference, combined with the saliency estimation of local pixels and the search of global targets to detect the salient object. However, applying the above SOD approaches for camouflaged object segmentation may not appropriate as the term "salient" is essentially the opposite of "camouflaged", i.e., standout versus immersion.

Specific Region Segmentation (SRS) we defined here refers to segmenting the specific region such as shadow, mirror, glass and water region in the scene. Such regions are special and has a critical impact on the vision systems. For the water, shadow and mirror region, there typically exists intensity or content discontinuities between the foreground and background. Instead, both the intensity and content are similar between the camouflaged objects and the background, leading to a great challenge of camouflaged object segmentation. Besides, the camouflaged objects are typically with more complex structures, compared with the glass region, and thus increasing the difficulty of accurate segmentation.

The present invention is based on the investigation and analysis of the existing scene segmentation technology and inspired by the process of prey capture by predators in nature. It proposes a segmentation method based on distraction mining, determines and removes distraction information, and forms a positioning and focus network for camouflaged object segmentation, namely PFNet. We have observed that in the process of predation in nature, predators will first locate potential prey from a global perspective and then focus on potential prey, gradually improve observation and judgment, and finally, determine prey and implement capture. The main difficulty for recognition or segmentation is the distraction information in the image, so PFNet's work is based on distraction mining. The input of PFNet is the RGB image containing camouflaged objects, and the output is the mask image. The value of the camouflaged object area in the mask image is 1, and the area without camouflaged object is 0. Experiments have proved that this method based on distraction mining can effectively segment different types of camouflaged objects and help improve the accuracy of scene understanding.

SUMMARY OF THE INVENTION

The purpose of the present invention is to creatively use the distraction mining method for the RGB image to realize the camouflaged object segmentation. PFNet successively includes a multi-level feature extractor, a positioning module, and three focus modules. The multi-level feature extractor uses a traditional feature extraction network to obtain contextual features with different levels; the positioning module is designed to mimic the detection process in predation for positioning the potential target objects from a global perspective and the focus module is then used to perform the identification process in predation for refining the initial segmentation results by focusing on the ambiguous regions. The present invention method is suitable for segmenting camouflaged objects with different types, positions, and sizes.

A method for camouflaged object segmentation with distraction mining, the method includes the following steps:

Step 1 Building PFNet

The camouflaged object segmentation network PFNet mainly consists of a multi-level feature extractor, a positioning module, and three focus modules.

The multi-level feature extractor is implemented based on the network ResNet-50 with feature extraction capabilities. The input of the multi-level feature extractor is an RGB image with several camouflaged objects. The extracted multi-level features are sequentially sent to a positioning module and three focus modules.

The positioning module aims to generate the initial location of camouflaged object. The positioning module consists of a channel attention block and a spatial attention block. The channel attention block and spatial attention block are implemented in a non-local way, to capture long-range dependencies in terms of channel and spatial position, for enhancing the semantic representation of the highest-level features from a global perspective. Specifically, given the input feature $F \in R^{C \times H \times W}$, where C, H, and W represent the channel number, height, and width, respectively, we first reshape F to get the query Q, key K, and value V, respectively, where $\{Q, K, V\} \in R^{C \times N}$ and $N = H \times W$ is the number of pixels. Then we perform a matrix multiplication between Q and the transpose of K, and apply a softmax layer to calculate the channel attention map $X \in R^{C \times C}$:

$$x_{ij} = \frac{\exp(Q_i \cdot K_j)}{\sum_{j=1}^{C} \exp(Q_i \cdot K_j)},$$

where, $x_{ij}$ measures the $j^{th}$ channel's impact on the $i^{th}$ channel. Finally, to enhance the fault-tolerant ability, we multiply the result by a learnable scale parameter $\gamma$ and perform an identify mapping operation to obtain the channel attention block's output $F' \in R^{C \times H \times W}$:

$$F'_i = \gamma \sum_{j=1}^{C} (x_{ij} V_j) + F_i$$

where $\gamma$ gradually learns a weight from an initial value of 1. The feature F' models the long-range semantic dependencies between the channels of feature maps and thus is more discriminative than the input feature F. Then, we feed the output features of channel attention block into the spatial attention block as the input. We first employ three 1×1 convolution layers on the features F' and reshape the convolution results to generate three new feature maps Q', K' and V' respectively, where $\{Q', K' \in R^{C_1 \times N}\}$, and $C_1 = C/8$, and $V' \in R^{C \times N}$. After that we perform a matrix multiplication between the transpose of Q' and K', and use the softmax normalization to generate the spatial attention map $X' \in R^{N \times N}$:

$$x'_{ij} = \frac{\exp(Q'_i \cdot K'_j)}{\sum_{j=1}^{N} \exp(Q'_i \cdot K'_j)},$$

where, $x'_{ij}$ denotes the $j^{th}$ position's impact on the $i^{th}$ position. Meanwhile, we conduct a matrix multiplication between V' and the transpose of X' and reshape the result to $R^{C \times H \times W}$. Similar to the channel attention block, we multiply the result by a learnable scale parameter $\gamma'$ and add a skip-connection to obtain the spatial attention block's output $F'' \in R^{C \times H \times W}$:

$$F''_i = \gamma' \sum_{j=1}^{N} (V'_j x_{ij}') + F'_i$$

where $\gamma'$ is also initialized as 1. F'' further gains the semantic correlations between all positions and thus enhancing the semantic representation of the feature. Finally, we can get the initial location map of the potential targets by applying a 7×7 convolution with the padding 3 on F''.

The focus module is designed to first discover and then remove these false predictions. The present invention first upsample the higher-level prediction and normalize it with a sigmoid layer. Then we use this normalized map and its reverse version to multiply the current-level features $F_c$, to generate the foreground-attentive features $F_{fa}$ and the background-attention features $F_{ba}$, respectively. Finally, we feed these two types of features into two parallel context exploration (CE) blocks to perform contextual reasoning for discovering the false-positive distractions $F_{fpd}$ and the false-negative distractions $F_{fnd}$ respectively. The CE block consists of four context exploration branches and each branch includes a 3×3 convolution channel reduction, a $k_i \times k_i$ convolution for local feature extraction, and a 3×3 dilated convolution with a dilation rate of $r_i$ for context perceiving. We set $k_i$, $i \in \{1, 2, 3, 4\}$ to 1, 3, 5, 7, and set $r_i$, $i \in \{1, 2, 3, 4\}$ to 1, 2, 4, 8, respectively. The output of the $i^{th}$, $i \in \{1, 2, 3\}$ CE branch will be fed into $(i+1)^{th}$ branch to be further processed in a larger receptive field. The outputs of all four branches are then concatenated and fused via a 3×3 convolution. By such design, the CE block gains the capability of perceiving abundant contexts over a wide range of scales and thus could be used for context reasoning and distraction discovery. After distraction discovery, we can perform distraction removal in the following way:

$$F_{up} = U(CBR(F_h)),$$

$$F_r = BR(F_{up} - \alpha F_{fpd}),$$

$$F_r' = BR(F_r + \beta F_{fnd}),$$

where $F_h$ and $F_r'$ denote the input higher-level features and the output refined features, respectively; CBR presents the combination of convolution, batch normalization (BN) and ReLU; U is the bilinear upsampling; and $\alpha$ and $\beta$ are the learnable scale parameters. Here we use the element-wise subtraction operation to suppress the ambiguous backgrounds (i.e., false-positive distractions) and the element-wise addition operation to augment the missing foregrounds (i.e., false-negative distractions). Finally, a more accurate prediction map can be obtained by applying a convolution layer on the refined feature $F_r'$;

Step 2 Training Process

During training, the training data is first fed into the multi-level feature extractor of the network, and the extracted results are fed into a positioning module and three focus modules successively. Then, the positioning module uses the channel attention block and the spatial attention block to initially locate the camouflaged object in the image. The focus module repeatedly mines the camouflaged object information and removes environmental distraction information, and finally obtains fine prediction results. We use the ground truth map to supervise the generated map, to force the $F_r'$ into a purer representation than $F_h$, i.e., the distraction removed features. This would further guide the CE block to discover the specific form of distractions and make the whole focus module works on distraction discovery and removal in an implicit way. For the positioning module, we impose binary cross-entropy (BCE) loss $l_{bce}$ and IoU loss $l_{iou}$ on its output, i.e., $L_{pm} = l_{bce} + l_{iou}$, to guide the positioning module to explore the initial location of the target object. For the focus module, we hope it could focus more on the distraction region. Such region is typically located at the object's boundaries, elongated areas, or holes. Thus we combine the weighted BCE loss $l_{wbce}$ and the weighted IoU loss $l_{wiou}$, i.e., $L_{fm}=l_{wbce}+l_{wiou}$ to force the focus module pay more attention to the possible distraction region. Finally the overall loss function is:

$$L_{overall} = L_{pm} + \sum_{i=2}^{4} 2^{(4-i)} L_{fm}^i$$

Where $L_{fm}^i$ denotes the loss for the prediction of the focus module at i-th level of the PFNet.

The beneficial effects of the present invention:

(1) Method innovation

The present invention introduces the concept of distraction mining into the field of the camouflaged object segmentation and develops a new distraction discovery and distraction removal strategy to help the camouflaged object segmentation. We propose the positioning and focus network with a well-designed focus module to first discover and then remove these distractions. To the best of our knowledge, we are the first to mine distractions for camouflaged object segmentation and we believe that the proposed strategy of distraction mining could provide insights to other vision tasks.

(2) Results and efficiency

As the first method of using distraction mining in camouflaged object segmentation, the present invention helps the visual system to distinguish the camouflaged object from the environment. In the comparative experiment, PFNet has obtained the superior performance on the three commonly used indicators ($S_\alpha$, $E_\Phi^{ad}$ and $F_\beta^\omega$), and the advantages are obvious. The segmentation result of PFNet is excellent, and the degree of fineness at the boundary of the camouflaged object is also satisfactory.

(3) Wider Applicability

The present invention is suitable for the segmentation of various types of camouflaged objects. PFNet has obvious performance advantages on the following types of images: a) images with small-volume camouflaged objects; b) images with large-volume camouflaged objects; c) images with camouflaged objects' area content similar to the surrounding environment or unclear borders; d) images with occluded camouflaged objects. All of the above proves the effectiveness and practicality of PFNet.

DETAILED DESCRIPTION

The specific embodiments of the present invention will be further described below in conjunction with the drawings.

We evaluate our method on three benchmark datasets: CHAMELEON (76 images), CAMO (1250 images), and COD10K (5066 images). We follow previous work to use the training set of CAMO and COD10K as the training set (4,040 images) and others as testing sets. For testing, the image is first resized to 416×416 for network inference and then the output map is resized back to the original size of the input image. Both the resizing processes use bilinear interpolation. The parameters of the feature extraction network are initialized by the pre-trained ResNet-50 network, and other parameters are initialized randomly.

In PFNet, images with the camouflaged object are fed into the multi-level feature extractor, and the result is fed into the positioning module and the focus module. The positioning module consists of a channel attention block and a spatial attention block, which captures the long-range semantic dependence of the channel and spatial position to infer the approximate position of the target object from a global perspective. The focus module performs multi-scale context exploration based on the foreground attention (background attention) function to find false positive (false negative) distraction, and then remove the distraction to obtain a purer segmentation of the target object. We implement our model with the PyTorch toolbox. An eight-core PC with an Intel Core i7-9700K 3.6 GHz CPU (with 64 GB RAM) and an NVIDIA GeForce RTX 2080Ti GPU (with 11 GB memory) is used for both training and testing.

Figure 1:
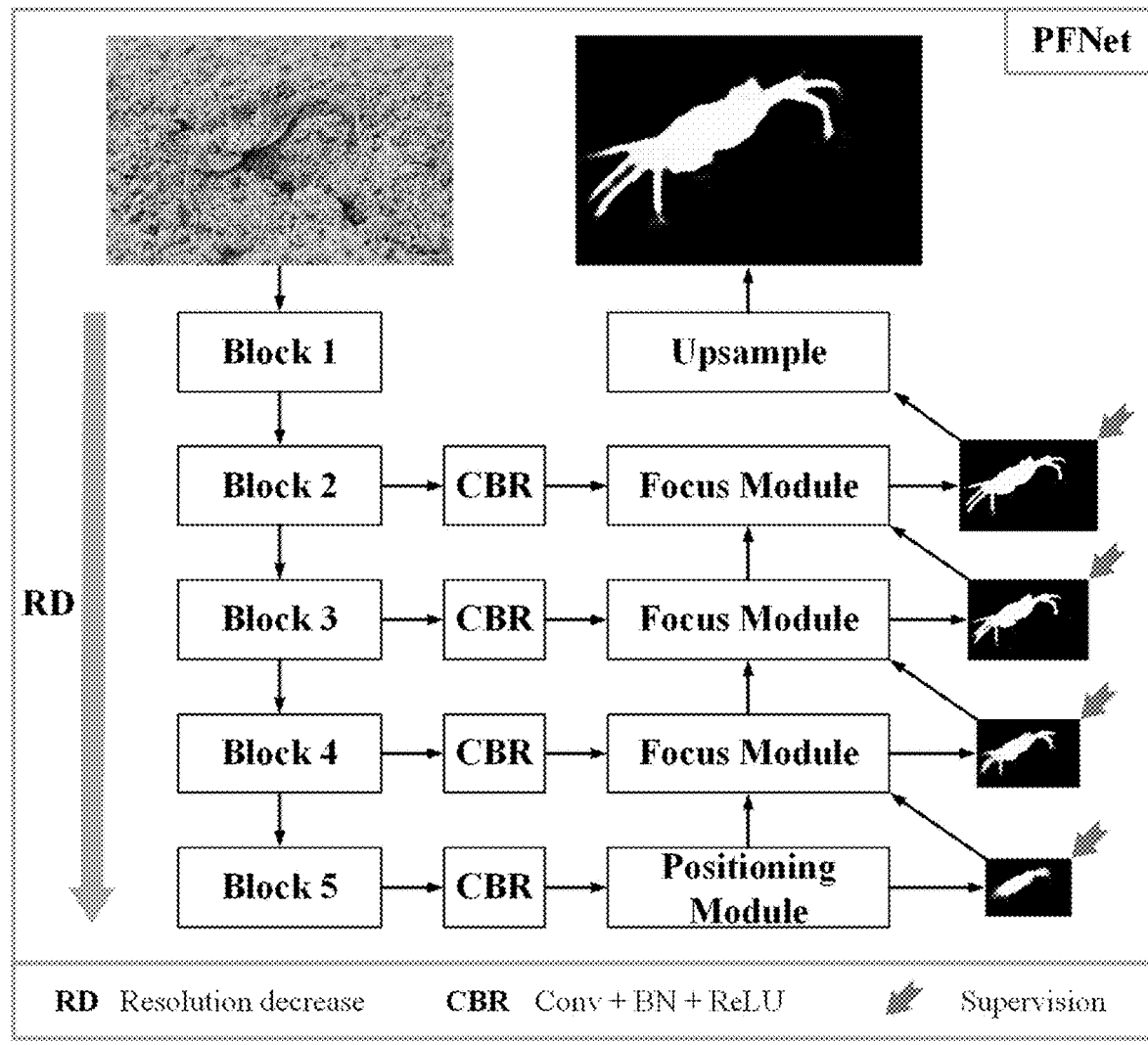
FIG. 1 is the network structure of PFNet.

FIG. 1 shows the network structure of PFNet. It consists of a multi-level feature extractor, a positioning module, and three focus modules. The feature extractor first works on the input image. Then the positioning module predicts the location of the camouflaged object, and the focus module discovers and removes the distraction to generate the final result of the camouflaged object segmentation.

Figure 2:
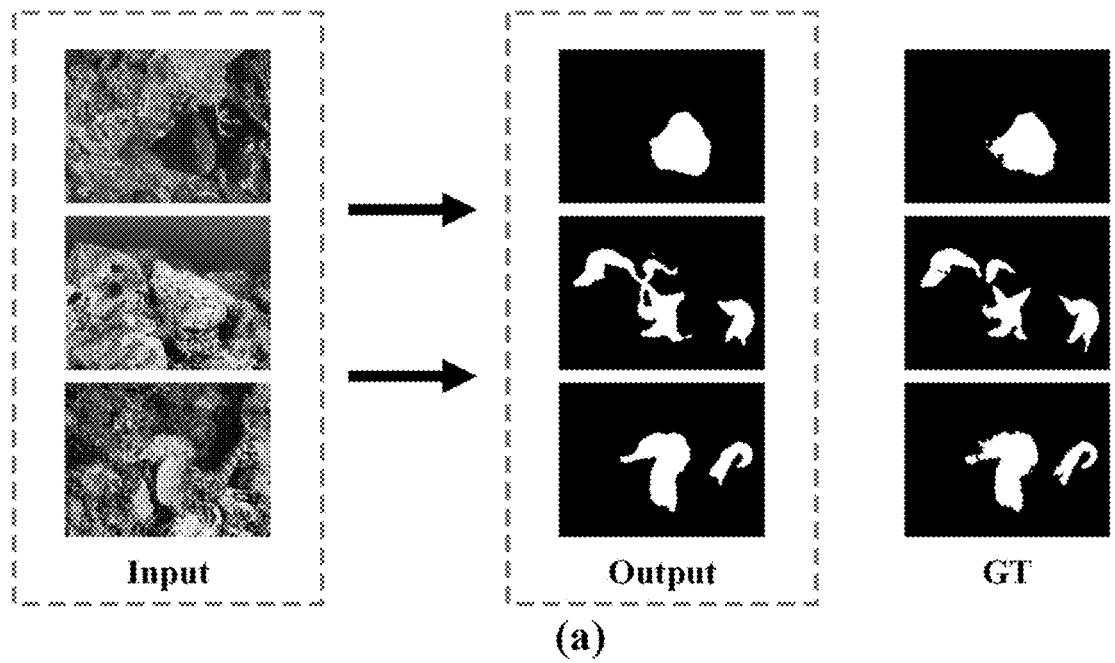
FIG. 2 is the results of PFNet and the comparative experiment, (a) the display of the PFNet's result, (b) the display of the comparative experiment result.
Figure 2:
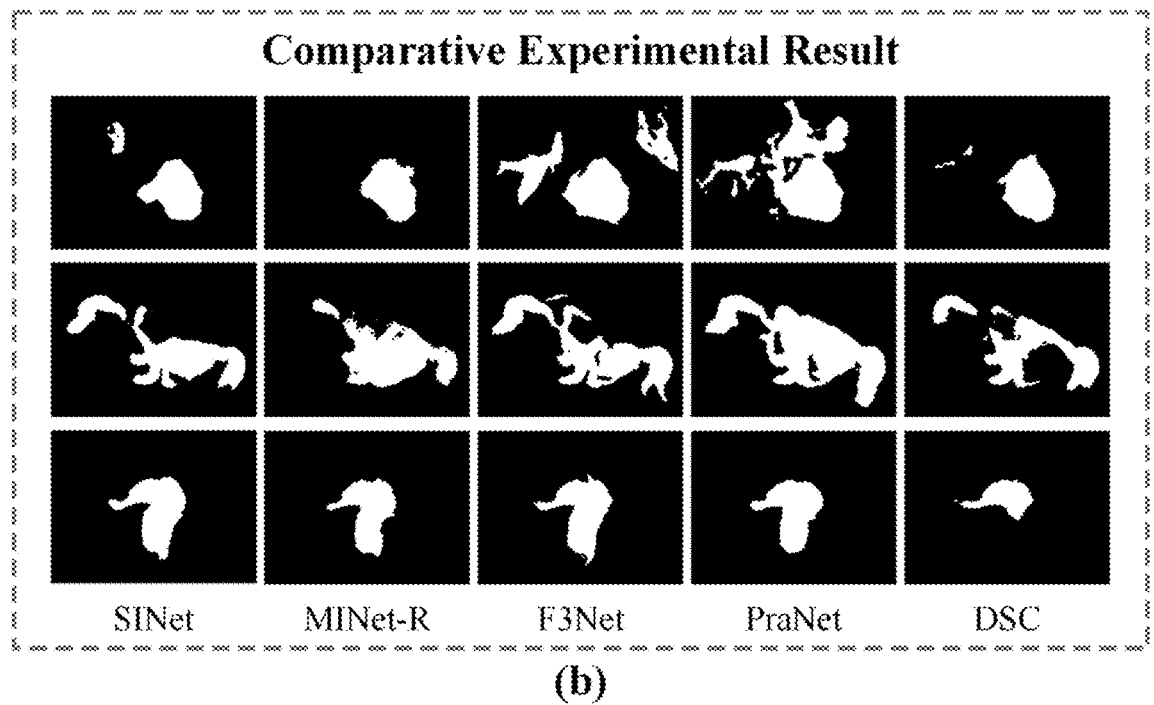

FIG. 2 displays the result of PFNet and the comparative experiments. FIG. 2(a) is the display of PFNet's output. The rightmost column is the manually annotated mask image for comparison; FIG. 2(b) shows the results of the SOTA methods in the field (SINet, MINET-R, F3Net, PraNEt, and DSC) to verify the effectiveness of PFNet. We retrained them using the publicly available codes on the same training set and tested them on the same testing set.

The invention claimed is:

1. A method for camouflaged object segmentation with distraction mining, comprising steps of:
building a camouflaged object segmentation network PFNet that mainly consists of a multi-level feature extractor, a positioning module, and three focus modules;
implementing the multi-level feature extractor based on network ResNet-50 with feature extraction capabilities; input of the multi-level feature extractor is an RGB image with several camouflaged objects; a positioning module and three continuous focus modules take extracted multi-level features as input; wherein the positioning module aims to generate initial location of camouflaged object; the positioning module consists of a channel attention block and a spatial attention block;
implementing the channel attention block and spatial attention block in a non-local way, to capture global dependencies in terms of channel and spatial position, for enhancing semantic representation of the highest-level features from a global perspective; given an input feature $F \in R^{C \times H \times W}$ where C, H, and W represent channel number, height, and width, respectively, first reshaping F to get query Q, key K, and value V, respectively, where $\{Q, K, V\} \in R^{C \times N}$ and $N=H \times W$ is number of pixels; then performing a matrix multiplication between Q and transpose of K, and applies a softmax layer to calculate channel attention map $X \in R^{C \times C}$:

$$x_{ij} = \frac{\exp(Q_i \cdot K_j)}{\sum_{j=1}^{C} \exp(Q_i \cdot K_j)},$$

where $x_{ij}$ measures the $j^{th}$ channel's impact on the $i^{th}$ channel; finally, to enhance fault-tolerant ability, multiplying a result by a learnable scale parameter γ and performing an identify mapping operation to obtain the channel attention block's output $F' \in R^{C \times H \times W}$:

$$F'_i = \gamma \sum_{j=1}^{C} (x_{ij} V_j) + F_i$$

where γ gradually learns a weight from an initial value of 1; then, the spatial attention block takes the output features of channel attention block as input; first employing three 1×1 convolution layers on the features F' and reshaping convolution results to generate three new feature maps Q', K' and V' respectively, where {Q', K'∈ $R^{C_1 \times N}$}, and $C_1$=C/8, and V'∈ $R^{C \times N}$, after that performing a matrix multiplication between the transpose of Q' and K', and uses softmax normalization to generate spatial attention map X'∈ $R^{N \times N}$:

$$x'_{ij} = \frac{\exp(Q'_i \cdot K'_j)}{\sum_{j=1}^{N} \exp(Q'_i \cdot K'_j)},$$

where, $x'_{ij}$ denotes the $j^{th}$ position's impact on the $i^{th}$ position; meanwhile, conducting a matrix multiplication between V' and the transpose of X' and reshaping the result to $R^{C \times H \times W}$; similar to the channel attention block, the spatial attention block multiplies a result by a learnable scale parameter γ' and adds a skip-connection to obtain the spatial attention block's output F"∈ $R^{C \times H \times W}$:

$$F''_i = \gamma' \sum_{j=1}^{N} (V'_j x_{ij}') + F'_i$$

where γ' is also initialized as 1; F" further gains semantic correlations between all positions and thus enhancing the semantic representation of the feature; finally, getting initial location map of potential targets by applying a 7×7 convolution with padding 3 on F";

designing a focus module to first discover and then removing these false predictions; first upsampling the higher-level prediction and normalize it with a sigmoid layer; then using the normalized map and its reverse version to multiply current-level features $F_c$, to generate foreground-attentive features $F_{fa}$ and background-attention features $F_{ba}$, respectively; finally, feeding these two types of features into two parallel context exploration (CE) blocks to perform contextual reasoning for discovering false-positive distractions $F_{fpd}$ and false-negative distractions $F_{fnd}$, respectively; CE block consists of four context exploration branches and each branch includes a 3×3 convolution channel reduction, a $k_i \times k_i$ convolution for local feature extraction, and a 3×3 dilated convolution with a dilation rate of $r_i$ for context perceiving; setting $k_i$, i∈{1, 2, 3, 4} to 1, 3, 5, 7, and setting $r_i$, i∈{1, 2, 3, 4} to 1, 2, 4, 8, respectively; feeding the output of the $i^{th}$, i∈{1, 2, 3} CE branch into $(i+1)^{th}$ branch, $(i+1)^{th}$ branch has a larger receptive field than $i^{th}$ CE branch; concatenating and fusing the outputs of all four branches via a 3×3 convolution; by such design, the CE block gains capability of perceiving abundant contexts over a wide range of scales and thus use it for context reasoning and distraction discovery; after distraction discovery, performing distraction removal in the following way:

$$F_{up} = U(CBR(F_h)),$$

$$F_r = BR(F_{up} - \alpha F_{fpd}),$$

$$F_r' = BR(F_r + \beta F_{fnd}),$$

where $F_h$ and $F_r'$ denote input higher-level features and the output refined features, respectively; CBR presents the combination of convolution, batch normalization (BN) and ReLU; U is bilinear upsampling; and α and β are learnable scale parameters; here the method uses the element-wise subtraction operation to suppress the ambiguous backgrounds, i.e., false-positive distractions and the element-wise addition operation to augment the missing foregrounds, i.e., false-negative distractions; finally, applying a convolution layer on the refined feature $F_r'$ can generate a more accurate prediction map;

step 2, training process during training, feeding a training data into the multi-level feature extractor of the network, and feeds extracted results into a positioning module and three focus modules successively; then, the positioning module uses the channel attention block and the spatial attention block to initially locate the camouflaged object in the image; the focus module repeatedly mines the camouflaged object information and removes environmental distraction information, and finally obtains fine prediction results; using a ground truth map to supervise a generated map, to force the $F_r'$ into a purer representation than $F_h$, i.e., the distraction removed features; features would further guide the CE block to discover the specific form of distractions and make a whole focus module works on distraction discovery and removal in an implicit way; for the positioning module, imposing binary cross-entropy (BCE) loss $l_{bce}$ band IoU loss $l_{iou}$ on its output, i.e., $L_{pm} = l_{bce} + l_{iou}$, to guide the positioning module to explore the initial location of the target object; the focus module focuses on the distraction region; such region typically locates at the object's boundaries, elongated areas, or holes; thus combining the weighted BCE loss $l_{wbce}$ and the weighted IoU loss $l_{wiou}$, i.e., $L_{fm} = l_{wbce} + l_{wiou}$ to force a focus module pay more attention to a possible distraction region; finally the overall loss function is:

$$L_{overall} = L_{pm} + \sum_{i=2}^{4} 2^{(4-i)} L_{fm}^i$$

a function can guide PFNet to generate a better segmentation result of the camouflaged object based on the input image.

* * * * *